May 29, 1928.
H. C. HAYES
METHOD OF AND APPARATUS FOR THE TRANSMISSION OF FLUIDS
THROUGH PIPES OR CONDUITS
Filed Sept. 3, 1921
1,671,719
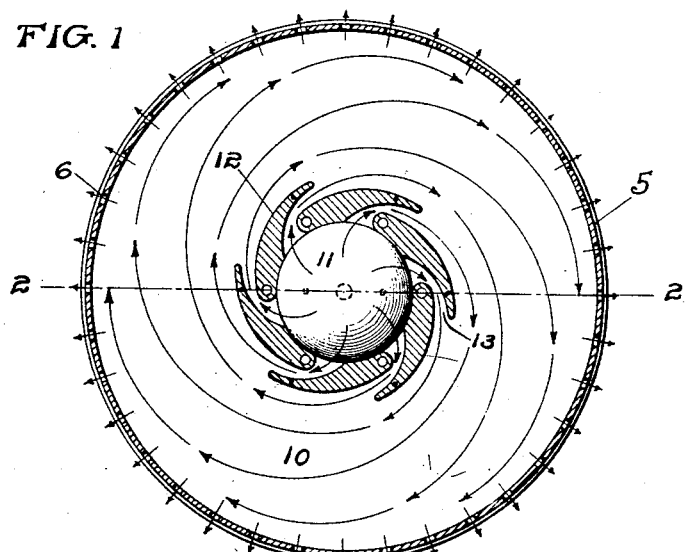
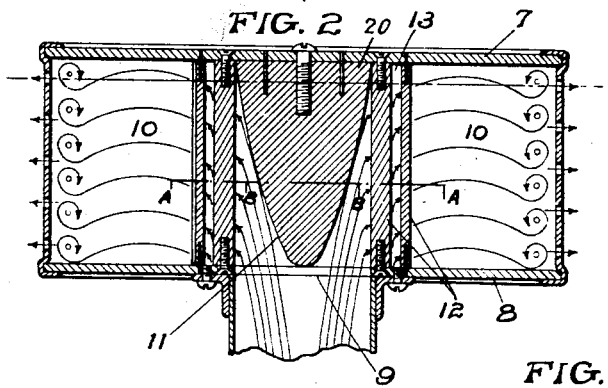
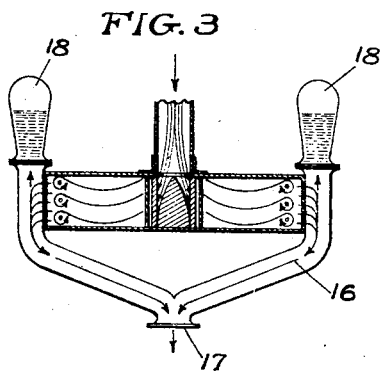
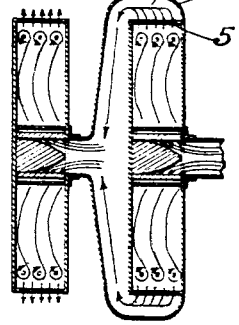
Inventor
Harvey C. Hayes
By Earle L. Keeler
Attorney Patented May 29, 1928.

1,671,719

UNITED STATES PATENT OFFICE.

HARVEY CORNELIUS HAYES, OF ANNAPOLIS, MARYLAND.

METHOD OF AND APPARATUS FOR THE TRANSMISSION OF FLUIDS THROUGH PIPES OR CONDUITS.

Application filed September 3, 1921. Serial No. 498,517.

The present invention relates to the transmission of fluids through pipe lines or conduits supplied by reciprocating pumps or the exhaust from reciprocating engines and similiar purposes.

Under the most favorable conditions of periodic flow the maximum strains to which the pipes and machinery are subjected are much greater than would be necessary if the same rate of delivery were obtained under steady flow; but if at any time the relation between the length of pipe line, elasticity and density of the fluid, and frequency of the flow impulses becomes such that the fluid column is in resonance, then excessive pressures may build up in the pipe line and back up against the source of supply. These abnormal pressures and their resulting strains not only shorten the life of the installation but they result in materially decreasing its efficiency. This decrease of efficiency, due to excessive back pressure in the exhaust line, is particularly noticeable in the case of internal combustion engines where the effect of such back pressure is not only to reduce the mean effective pressure on the pistons but to further reduce the efficiency by preventing a complete exhaust of the burnt gases from the cylinders, thereby reducing and adulterating the intake charges.

The excessive strains and back pressures are not the only disadvantages resulting from the transmission of fluids under periodic flow. Wherever rate flow meters are to be used, as in feed-water and steam supply lines, it is very desirable that the flow be uniform and not periodic—otherwise the recording device will not function properly. Numerous chemical processes require a uniform rate of delivery. When the fluid delivery is directly into the atmosphere, the noise produced by the periodic flow is oftimes objectionable. The best example of this is afforded by the exhaust from internal combustion engines where the sound generated by the periodic flow is so great and disturbing that such engines are required by law to be equipped with mufflers.

An object of the present invention is to eliminate the excessive strains and back pressures resulting from the periodic flow of fluids transmitted through pipes thereby increasing both the life and efficiency of the installation.

Another object of the invention is to eliminate, or greatly reduce, the sound caused by such flow at points where the delivery or exhaust leaves the transmitting system.

These objects are accomplished by connecting in series with the transmitting line, preferably as near the source of pressure as possible, one or more valves of a new type which is herein described in the matter of principle, construction and operation.

With the above and other objects in view the invention consists in the recognition of a principle and the construction, combination and arrangement of parts to render available such principle to the accomplishment in practice of said objects as will be hereinafter described.

Reference is to be had to the accompanying drawings forming a part of this specification in which like reference characters indicate corresponding parts throughout the several views, and in which Figure 1 is a cross sectional view of one form of valve suitable for the purposes heretofore mentioned, Fig. 2 is a section on the line 2—2 of Figure 1, Fig. 3 is a modified form of valve to be used in connection with the flow of a highly incompressible fluid, and Fig. 4 shows how two or more valves may be connected in series to increase the effectiveness of the valve action.

The principle of the valve may be illustrated by one having a cylindrical receiving chamber closed at both ends and having perforations through the cylindrical surface. The fluid enters the chamber through an opening in the center of one end of the chamber and is then deflected by vanes, or nozzles, so that the flow within the chamber is in the nature of a whirling or vortical motion about the axis of the cylinder. The fluid leaves the chamber through the perforations in the cylinder wall where it can be collected and transmitted further through pipe lines, or dissipated in the atmosphere.

Referring more particularly to the drawings, 5 indicates the cylindrical wall of the valve, which is provided with a plurality of perforations 6, and having plates 7 and 8 covering the ends, the plate 8 being provided with an opening 9 through which the fluid enters the chamber 10. A member 11 preferably conical in shape is secured to the plate 7 opposite the opening and extends into the chamber while mounted between the plates 7 and 8 are a number of vanes or nozzles 12 so constructed and arranged to form tangential passages 13 therebetween. These passages form a plurality of spirals about the central member 11. The member 11 is positioned in the direct path of the entering fluid for the purpose of reducing the cross-section in such a way as to keep the pressure of the entering fluid constant throughout the length of the passages between the vanes. If the valve is to be used in connection with the transmission of highly compressible fluids, such as gases or vapors, the passages between the vanes are preferably flared outward in to the chamber 10 similar to turbine nozzles so as to increase the velocity of flow in the chamber, but if the valve is to be used in connection with the flow of highly incompressible fluids, such as liquids, these passages are not so flared.

The action of the valve is as follows:—The centrifugal forces brought into play by the vortical motion of the fluid produce a pressure gradient directed outward along a radius of the cylinder chamber. This results in giving the fluid a greater tendency to travel outwards than it has to travel inwards and causes the device to act as a check-valve so long as the fluid in the chamber is whirling. The length of time through which this checking action holds depends upon the velocity of the whirling motion, the density, and the viscosity of the fluid. It also depends to considerable extent upon the dimensions and character of the walls of the receiving or vortex chamber.

Experiments carried out in connection with impulsive gas flow have shown that the valve action is effective for impulses separated by as much as one second and possibly longer, and the experiments have shown that the effectiveness of the checking action increases as the frequency of the impulses increase. The experiments also verified that the flow of gas beyond the valve was nearly uniform and the average pressure at the nozzle openings into the chamber was less than the average pressure in the line beyond the chamber.

These facts are readily explained as follows: Each flow impulse which enters the chamber is given a rapid whirling motion and the resulting centrifugal forces carry the gas to the outside of the chamber thereby leaving a partial vacuum at the nozzle outlets so that each entering impulse discharges against less back pressure than it otherwise would. Meantime, the moment of inertia of the gas of each whirling flow impulse which has entered the chamber keeps this gas pressed against the cylindrical wall while it gradually passes through the perforations at a substantially uniform rate. If the cross-section of the perforations and the volume of the chamber are properly proportioned, the flow of gas from the chamber can be made practically uniform and the back pressure on the source of supply at the same time reduced.

A suitable design of the member 11 is that of a paraboloid of revolution, the base 20 of which is of the same size as the inlet opening 9 of the chamber 10, and the height thereof is the same as that of the chamber 10. The vanes 12 are so arranged about the member 11 that should a section be taken across the member 11 and the vanes 12, for example on the plane A—A of Figure 2, the area of the section of the member 11 will be equal to the sum of the areas of the openings between the vanes as contained between the top plate 8 of the chamber 10 and the sectional plane A—A. Or, expressed in different terms, the area of the annular space B between the member 11 and the vanes will be equal to the sum of the areas of the openings between the vanes as contained between the sectional plane A—A and the base 20 of the member 11.

It will be seen from this description that the cross sectional area of the openings through which the impulse wave is to pass remains constant until the direction of the impulse has been changed from a line parallel to the axis of the member 11 to a direction that is substantially perpendicular to that axis. The energy of the impulse is then spent in the chamber 10 in the manner shown diagrammatically in Figure 2 and an even flow of fluid issues from the ports 6 in the cylindrical wall of the chamber 10. In such a design the fluid will pass through all sections of the passages at the same speed and therefore have the same rate of spin at all sections of the chamber perpendicular to its axis, and also the reflection of the impulses back against the source of pressure is reduced to a minimum.

Fig. 4 shows an arrangement whereby the flow can be made still more uniform by connecting two valves in series. To the valve nearest the source of supply is added an outer wall 14, forming a guide-way 15 between the perforated wall 5 through which the fluid is conducted to a second valve constructed similar to that shown in Fig. 2.

From the foregoing it is obvious that the effectiveness of the valve when used in connection with impulse gas flow is due to the fact that the vortical motion makes it possible to temporarily store an excess of gas in the vortex chamber without creating a back pressure on the source of supply. Since this gas is highly compressible, the whirling mass within the chamber is compressed and made more dense as it passes toward the outer wall. In this way it is temporarily stored around the outer portions of the chamber until it filters through the perforations.

In case of liquid, however, its incompressibility prevents storing an excess in this way and an air chamber must be provided for temporarily storing the excess so that a more or less steady flow will be maintained beyond the valve. Such an arrangement is shown in the modified form of Fig. 3.

In this figure a valve particularly adapted for use in connection with incompressible fluids is shown. This valve has in addition to the construction already described and shown in Figure 1 an outer chamber 16 converging to a central opening 17. The upper portion of the chamber 16 is enlarged to form a storage chamber 18 for the temporary storage of the excess fluid.

As previously stated the nozzle openings into the valve chamber are preferably flared similarly to the nozzles of a steam or air driven turbine when the valve is designed for use in connection with gas or vapor flow. Such a nozzle increases the effectiveness of the valve by transforming a part of the pressure, or potential energy, of the fluid into velocity, or kinetic energy. The increased velocity produced by the flaring nozzle increases the centrifugal forces brought into play and makes the pressure gradient along a radius of the chamber greater. This results in increasing the check-valve action of the device and creates a greater partial vacuum at the nozzle entrances, thereby reducing the back pressure against the source of supply.

It will be understood that the above description and accompanying drawings comprehend only the general and preferred embodiment of my invention and that various changes in details of construction, proportion and arrangement of parts may be made within the scope of the appended claims without sacrificing any of the advantages of my invention.

Having fully described my invention what I claim as new is:

1. A means for imparting a uniform rate of flow to a fluid having periodic velocity including a chamber having a centrally located entrance for the admission of fluid, means within the entrance for uniformly distributing the entering fluid, vanes placed along the locus of a spiral the center of which is upon the axis of the means within the entrance and surrounding said means for imparting a vortical motion to the distributed fluid, the said means extending from the top to the bottom of the chamber, and means permitting retarded escape of the fluid from the chamber.

2. A means for imparting a uniform rate of flow to a fluid having periodic velocity including a chamber having a centrally located entrance, means within the entrance for uniformly distributing the entering fluid, vanes placed along the locus of a spiral the center of which is upon the axis of the means within the entrance and surrounding the said means to impart a whorling motion to the entering fluid to produce a pressure gradient towards the peripheral wall of the chamber, and a plurality of means permitting retarded escape of the fluid from the chamber.

3. A means for imparting a uniform rate of flow to a fluid having periodic velocity including a chamber having a centrally located entrance for the admission of fluid, a conical member extending from the top of the chamber to the mouth of the entrance for uniformly distributing the entering fluid, vanes having diverging passageways therebetween located along the locus of a spiral the center of which is upon the axis of the conical member and surrounding the conical member, the area of any cross section of the conical member perpendicular to its axis being equal to the sectional area of the several passages included between this plane and the end of the chamber into which the fluid enters, and means permitting retarded escape of the fluid from the chamber.

HARVEY CORNELIUS HAYES.